(12) United States Patent
Akman et al.

(10) Patent No.: US 10,200,876 B2
(45) Date of Patent: Feb. 5, 2019

(54) METHOD AND SYSTEM FOR A WIRELESS ACCESS TRANSMISSION NETWORK ACROSS INTERSECTING ELECTROMAGNETICALLY SHIELDED REGIONS

(71) Applicant: ARGELA YAZILIM VE BILISIM TEKNOLOJILERI SAN. VE TIC. A.S., Istanbul (TR)

(72) Inventors: Arda Akman, Istanbul (TR); Onur Eker, Istanbul (TR); Burcu Yargicoglu, Istanbul (TR)

(73) Assignee: Argela Yazilim ve Bilisim Teknolojileri San. ve Tic. A.S. (TR)

( * ) Notice: Subject to any disclaimer, the term of this patent is extended or adjusted under 35 U.S.C. 154(b) by 75 days.

(21) Appl. No.: 15/408,125

(22) Filed: Jan. 17, 2017

(65) Prior Publication Data
US 2018/0206131 A1    Jul. 19, 2018

(51) Int. Cl.
*H04W 16/20* (2009.01)

(52) U.S. Cl.
CPC ................. *H04W 16/20* (2013.01)

(58) Field of Classification Search
CPC ...................................... H04W 80/04
See application file for complete search history.

(56) References Cited

U.S. PATENT DOCUMENTS

| | | | |
|---|---|---|---|
| 8,654,672 B1 | 2/2014 | Nicholas et al. | |
| 2004/0135676 A1* | 7/2004 | Berkman | H04B 3/54 370/464 |
| 2006/0025072 A1* | 2/2006 | Pan | H04W 52/242 455/11.1 |
| 2006/0271575 A1* | 11/2006 | Harris | G06F 9/52 |
| 2009/0156159 A1 | 6/2009 | Lim et al. | |
| 2009/0204805 A1* | 8/2009 | Robba | H04W 12/02 713/153 |
| 2013/0024029 A1* | 1/2013 | Tran | G16H 50/20 700/278 |
| 2014/0277777 A1* | 9/2014 | Potucek | H05B 37/02 700/282 |

\* cited by examiner

*Primary Examiner* — Chi Ho A Lee
*Assistant Examiner* — Andrew Lee
(74) *Attorney, Agent, or Firm* — IP Authority, LLC; Ramra Soundararajan

(57) ABSTRACT

The present invention is related to a wireless network node for deployment at the intersection points of a plurality of electromagnetically shielded regions, and methods for its configuration and placement to provide wireless access and transmission using minimal amount of network data cables.

15 Claims, 10 Drawing Sheets

METHOD AND SYSTEM FOR A WIRELESS ACCESS TRANSMISSION NETWORK ACROSS INTERSECTING ELECTROMAGNETICALLY SHIELDED REGIONS

BACKGROUND OF THE INVENTION

Field of Invention

The present invention is related to building wireless networks and particularly networks that span a plurality of horizontally and vertically adjacent electromagnetically shielded regions as seen in ships and shelters.

Discussion of Related Art

Similar to outdoors, wireless communication technologies are also adopted for indoors. Unlike outdoors, the main problem for indoors is the poor network coverage due to excessive fading of radio waves at the walls. Especially in environments such as ships, sub-marines, trains, buildings constructed with high amounts of metal components, and shelters where there are rooms constructed with thick concrete walls. It is difficult to extend wireless network service coverage to multiple rooms. Since radio waves are trapped within a room due to fading at the walls, exchanging data between rooms requires extra network data cables and routers. In these types of structures, the wireless access network devices located in the rooms are connected to a central network through cables and routers in most cases. However, if the environment taken into consideration is a vehicle such as a ship, the required length of cables can reach kilometers, causing major disadvantages such as installation costs, increase of the vehicle weight, etc. Besides, in distributed networks that are required to be decentralized, dynamic, and fault tolerant, where the network should be designed network cable free, there are no effective solutions.

In centralized networks, network nodes are configured to route the data they have received from user devices to the centralized network or central units. In these types of networks, first the data goes to the central unit, and then it is routed to the target network node. On the other hand, in decentralized and distributed networks, network nodes make the routing decisions either statically or dynamically by communicating with each other, without needing a central unit. When a network node receives data from other network node or a user device, it first computes the next route, and then forwards the data to the next hop. Contrary to centralized networks, in distributed networks, nodes transmit user data to its target relying on utilized algorithms, which consider various criteria such as transmitting the data through the route having the least number of network routers or through the route with minimum latency. There are several important aspects of these networks such as; self-configuration without a central unit, autonomous alternative route calculation in case of a possible failure among network nodes.

It is easy to deploy wireless networks outdoors, which are known to have high radio wave permeability. But, to deploy wireless networks indoors involving many electromagnetically shielded regions with low radio signal permeability, significant amount of network cables and wireless network nodes are required. Especially in environments such as ships, which involve many vertical and horizontal consecutive electromagnetically shielded regions, the requirement mentioned for cables and nodes significantly increases. Moreover, a shielded region belonging to those environments is expected to exchange data between all neighboring shielded regions, which makes deploying a network fairly complicated—especially for the ones for wireless decentralized networks. Additionally, as radio waves are trapped inside the shielded regions due to their low radio signal permeability, exchanging data between neighboring shielded regions is not possible by using wireless technology. Under these circumstances, it is necessary to provide a method for exchanging data between shielded regions, plus a full network solution that enables communications across all network nodes that are located in different shielded regions.

As an example of indoor network applications, the US Patent Application 20090156159 titled "Communication system and method in ship area network" presents a communication system designed for ships, which involves electromagnetically shielded regions. In this application, the communication system utilizes a combination of power line communications, fiber optic lines, and wireless technologies. However, in this patent application, neither cost-reducing measures during the setup and operations of the network such as energy consumption, total cost, and number and weight of cables, nor the efficiency measures for air interface usage are taken into consideration.

In U.S. Pat. No. 8,654,672, titled "Method for optimal transmitter placement in wireless mesh networks", the optimum deployment of transmitters in wireless networks using a mesh topology is explained. The patent does not refer to the aforementioned wireless communication problems regarding indoor and electromagnetically shielded environments.

Alternative solutions are needed for setting up wireless access and transmission networks for environments containing a plurality of electromagnetically shielded regions where data exchange is not possible via radio waves. One solution is to directly connect network nodes in neighboring shielded regions. In this solution, in order to exchange data between all neighboring shielded regions, at least one network node per region is necessary and each neighboring region must be connected via data cables. Another solution is to connect the network nodes in each shielded region through the addition of network routers and data cables. Both solutions require substantial amount of data cables, increasing the initial network deployment cost as well as the network maintenance operations complexity and related costs.

While it is possible to exchange data wirelessly between network nodes within a shielded region, data cables are required for exchanging data across network nodes in the neighboring shielded regions. These network nodes can optionally behave as wireless network access units to enable user devices located in those shielded regions to wirelessly connect to the network. In this topology, an efficiency problem arises due to the presence of a large number of wireless network nodes within the shielded regions. An increase in the number of wireless network nodes sharing the same air interface causes a decrease in the aggregate throughput of the shared air interface, which causes a decrease in data speed per network node. As a result, bottlenecks may occur in network transmission. Additionally, with the increasing number of network nodes, routing protocol applications that are running on the network nodes with limited processor and memory capacity start to require higher amounts of computation and memory. Furthermore, an increase in the number of routing nodes results in a rise in network control traffic caused by the communication of network nodes to establish the routing within the network. In addition to these disadvantages, using too many units in the network results in higher energy consumption, an increase in total network costs, and a more complicated network management process. The present innovation aims at addressing all the aforementioned problems regarding the deployment of wireless access and transmission networks in environments that involve multiple shielded regions with low radio wave permeability in between.

Embodiments of the present invention are an improvement over prior art systems and methods.

SUMMARY OF THE INVENTION

The present invention provides a wireless network node placement method to reduce the number of nodes deployed in a plurality of magnetically shielded regions that intersect horizontally and vertically, wherein the method comprises: (a) selecting an outermost electromagnetically shielded region out of the plurality of magnetically shielded regions, identifying a corner in the outermost electromagnetically shielded region which intersects with most number of neighboring regions, and adding the corner as a selected intersection point to a set of candidate intersection points, and: (i) identifying all other corners that are space diagonally located with respect to the identified corner in (a), where such corners are in those intersecting neighboring regions of the identified corner in (a), (ii) adding corners identified in (a)(i) to the set of candidate intersection points, and (iii) marking all regions touched by corners in the set of candidate intersection points as traversed regions with remaining regions staying un-traversed; (b) repeating steps (a)(i) through a(iii) at intersection points of un-traversed regions until no un-traversed region is left by selected corners in the set of candidate intersection points; (c) eliminating superfluous corners in the set of candidate intersection points by starting from those corners with least number of intersecting neighboring regions and moving towards corners with most number of intersecting neighboring regions and assessing whether a given corner can be eliminated from the set without creating an un-traversed region and, when so, removing it from the set of candidate intersection points; and (d) outputting the set of candidate intersection points after the eliminating step (c) as the reduced number of nodes to be deployed in the plurality of magnetically shielded regions.

The present invention provides a wireless network node placement and wireless transmission method to remove the need for a data cable and to reduce the number of wireless networks nodes for a first magnetically shielded region and second magnetically shielded region with an intersection point, the first magnetically shielded region and second magnetically shielded region using different carrier frequencies, $f_1$ and $f_2$, respectively, wherein the method comprises: (a) deploying, at the intersection point between the first magnetically shielded region and the second magnetically shielded region and, on the first electromagnetically shielded region's space, a single wireless network node, the single wireless network node comprising a first and second antenna, the first antenna operating at the carrier frequency $f_1$, (b) extending the single wireless network node's second antenna towards the second magnetically shielded region's space via an antenna cable for operation at the carrier frequency $f_2$, and wherein wireless access and transmission is provided across the first and said second electromagnetically shielded regions via the single wireless network node's first antenna operating at carrier frequency $f_1$ in the first electromagnetically shielded region and the single wireless network node's extended second antenna operating at carrier frequency $f_2$ in the second electromagnetically shielded regions.

The present invention provides a wireless network node placement and transmission method to remove a need for a data cable and to reduce the number of wireless networks nodes in n number of neighboring electromagnetically shielded regions meeting at an intersection point, the regions supporting carrier frequencies $f_1, f_2, f_3, \ldots, f_n$, the method comprising: (a) deploying, at the intersection point, a single wireless network node with a maximum number of supportable carrier frequencies equal or larger than n, the single wireless network node being placed within the first electromagnetically shielded region's space, the single wireless network node comprising a plurality of antennas, one for each of the carrier frequencies $f_1, f_2, f_3, \ldots, f_n$, the first antenna operating at the carrier frequency $f_1$, the single wireless network node's first antenna operating at the carrier frequency $f_1$, (b) extending each of the wireless network node's other antennas operating at the carrier frequencies $f_2, f_3, \ldots, f_n$ towards regions 2, 3, ..., n, respectively, via an antenna cable for operation at the carrier frequencies $f_2, f_3, \ldots, f_n$, and wireless access and transmission is provided across the first and said second electromagnetically shielded regions via the single wireless network node's antennas operating at carrier frequency $f_1$ in the first electromagnetically shielded region and the single wireless network node's extended antennas operating at the carrier frequencies $f_2, f_3, \ldots, f_n$, in remaining electromagnetically shielded regions 2, 3, ..., n.

The present invention provides a wireless network node placement and transmission method to provide redundancy in n number of neighboring electromagnetically shielded regions meeting at an intersection point, said regions supporting carrier frequencies $f_1, f_2, f_3, \ldots, f_n$, the method comprising the steps of: (a) deploying a first and second identical wireless network nodes, each of the first and second identical nodes with a maximum number of supportable carrier frequencies equal or larger than n at the intersection point, such that if one of the first or second identical wireless network nodes fail, the other node provides wireless access and transmission across said plurality of electromagnetically shielded regions; (b) placing the first wireless network node within a first electromagnetically shielded region's space, the first wireless network node comprising a plurality of antennas, one for each of the carrier frequencies $f_1, f_2, f_3, \ldots, f_n$, the first antenna of the first wireless node operating in the first electromagnetically shielded region's space at the carrier frequency $f_1$, with remaining antennas of the first wireless node extended towards other electromagnetically shielded regions 2, 3, ..., n, via an antenna cable, with the remaining antennas of the first wireless node operating at carrier frequencies $f_2, f_3, \ldots, f_n$, respectively; and (c) placing the second wireless network node within a second electromagnetically shielded region's space, the second wireless network node also comprising a plurality of antennas, one for each of the carrier frequencies $f_1, f_2, f_3, \ldots, f_n$, the first antenna of the first wireless node operating in the first electromagnetically shielded region's space at the carrier frequency $f_2$, with remaining antennas of the first wireless node extended towards other electromagnetically shielded regions 1, 3, ..., n, via an antenna cable, with the remaining antennas of the second wireless node operating at carrier frequencies $f_1, f_3, \ldots, f_n$, respectively.

The present invention provides a wireless network node deployed at the intersection point between at least a first and second magnetically shielded regions to perform switching and routing functions, the wireless network node comprising: (a) a node processor; (b) storage; (c) at least one data network connect connector; (d) at least a first and second antenna, with each antenna being configurable through instructions stored in the storage and executed by the processor to operate in the same or different carrier frequencies, and each antenna configurable with an antenna cable of a specific length to extend its reach into a nearby magnetically shielded region; and (e) a node wireless control module to configure operations of the wireless network node by governing a number of active antennas and data ports, and mapping of carrier frequencies to antennas.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
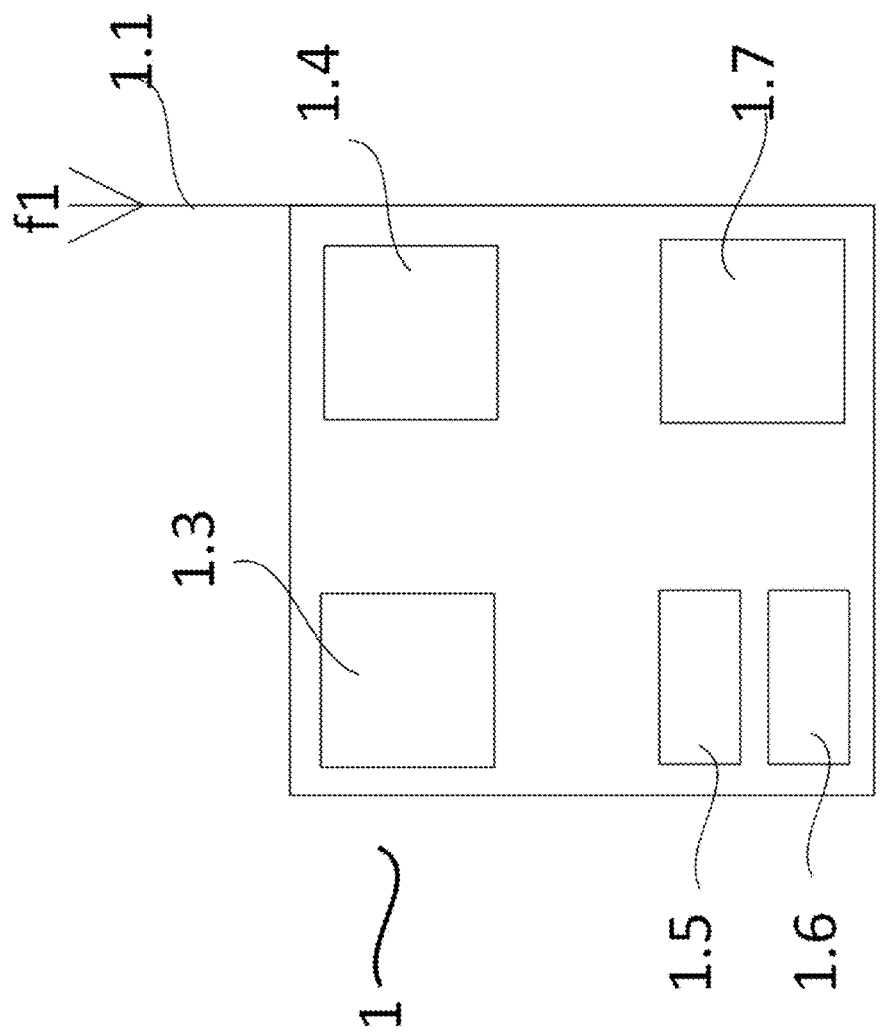
FIG. 1 shows a block diagram of a prior art wireless network node supporting single carrier frequency used for networking within an electromagnetically shielded region.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The purpose of the invention is to eliminate existing disadvantages by decreasing the amount of network data cables and the number of wireless network nodes needed for the deployment of wireless access and transmission networks in environments that involve multiple shielded regions with low radio signal permeability in between.

Another purpose of the invention is to decrease the total number of wireless network nodes by appropriately placing wireless network nodes needed for the deployment of wireless access and transmission networks in environments that involve multiple shielded regions which are horizontally and vertically neighboring with low radio signal permeability in between.

Another purpose of the invention is to increase the efficient usage of air interface capacity inside the shielded region particularly for Wi-Fi by decreasing the number of wireless network nodes needed for the deployment of wireless access and transmission networks in environments that involve multiple shielded regions with low radio signal permeability in between.

Another purpose of the invention is to increase the average data throughput per each wireless network node by decreasing the number of wireless network nodes needed for the deployment of wireless access and transmission networks in environments that involve multiple shielded regions with low radio signal permeability in between.

Another purpose of the invention is to reduce the energy consumption in the network by decreasing the number of wireless network nodes needed for the deployment of wireless access and transmission networks in environments that involve multiple shielded regions with low radio signal permeability in between.

Another purpose of the invention is to reduce the network control traffic generated for route calculation among wireless network nodes by decreasing the number of wireless network nodes needed for the deployment of wireless access and transmission networks in environments that involve multiple shielded regions with low radio signal permeability in between.

Another purpose of the invention is to reduce the processor power and memory requirement per wireless network node needed for route calculations and storage of routes by decreasing the number of wireless network nodes needed for the deployment of wireless access and transmission networks in environments that involve multiple shielded regions with low radio signal permeability in between.

Another purpose of the invention is to reduce the end-to-end network latency by decreasing the data routing and forwarding latency per wireless network node by decreasing the number of wireless network nodes needed for the deployment of wireless access and transmission networks in environments that involve multiple shielded regions with low radio signal permeability in between.

Another purpose of the invention is to reduce the total monetary cost of the network by decreasing the number of wireless network nodes and cables needed for the deployment of wireless access and transmission networks in environments that involve multiple shielded regions with low radio signal permeability in between.

Another purpose of the invention is to reduce network operation and management efforts and labor costs by decreasing the number of wireless network nodes and cables needed for the deployment of wireless access and transmission networks in environments that involve multiple shielded regions with low radio signal permeability in between.

Another purpose of the invention is to reduce the total physical weight of the network by decreasing the number of wireless network nodes and cables needed for the deployment of wireless access and transmission networks in environments that involve multiple shielded regions with low radio signal permeability in between.

In order to fulfill the aforementioned purposes, a novel system and various deployment methods are introduced in environments that involve communications across multiple shielded regions with low radio signal permeability in between.

In a preferred embodiment of the invention, a new type of wireless network node and an innovative placement method for wireless data access and transmission network solution in a plurality of intersecting electromagnetically shielded regions is applied for maintaining communication in and across all electromagnetically shielded regions by deploying at least one such wireless network node presented in this invention at the intersection point of the regions. Furthermore, these wireless network nodes can be interconnected via short network data cables if more than one such node is deployed at an intersection. With the invention, it is possible to reduce the number of network data cables by eliminating all except the mandatory network data cables needed for the absolute minimum connectivity to reduce the length and thereby cost of cables used.

The invention reduces the number of wireless network nodes by placing the abovementioned wireless network nodes to locations where most number of regions intersect and at space diagonally faced corners/vertices in each electromagnetically shielded region. By reducing the number of wireless network nodes that share the same air interface in electromagnetically shielded regions, the invention makes it possible to increase the aggregate throughput of the air interface.

The system of invention is a wireless network node designed for intersection points between electromagnetically shielded regions, which can also act as a regular wireless network node to be used within each electromagnetically shielded region. It supports:

(a) Multiple antennas with the same or different carrier frequencies, a different frequency assignable to each antenna;

(b) Multiple antenna cables to extend any chosen antenna away from the wireless network node;

(c) One or more network data cable interfaces to interconnect the wireless network node to other wireless network nodes so that the group of nodes can act as a cluster, or simply to provide redundancy at the intersection point;

(d) Optionally, configurable to different wireless technologies such as Wi-Fi, WiMAX and 4G, 5G.

In another preferred embodiment of the invention, a wireless network node placement method is applied by grouping in pairs the intersecting electromagnetically shielded regions and deploying one wireless network node of this invention with its antenna operating in the first carrier frequency, $f_1$, into the first electromagnetically shielded region, and extending the abovementioned wireless network node's secondary antenna operating in the second carrier frequency, $f_2$, towards the second electromagnetically shielded region using an antenna cable to provide wireless access and transmission in the second region. As a result, only one wireless access node is needed between any pair of intersecting regions even when the carrier frequencies of the two regions are different.

In another preferred embodiment of the invention, a wireless network node placement method is applied by grouping several intersecting electromagnetically shielded regions in at most the number of different frequencies supportable by the aforementioned wireless network node and deploying one said wireless network node at the intersection point. The wireless network node is deployed at the intersection point in such a way that it is physically within the first electromagnetically shielded region with one antenna pointing to that region, and all other antennas are extended with antenna cables to all other electromagnetically shielded regions with at least one antenna per region, such that each said antenna is operating at the carrier frequency of the corresponding region in which the antenna is deployed. As a result, the invention eliminates the need to place a wireless network node in each of the electromagnetically shielded regions that are grouped at the intersection point. Doing so, the invention reduces the total number of wireless network nodes required for the wireless data access and transmission network. In addition, the invention makes it possible to provide wireless access and transmission to all desired electromagnetically shielded regions by placing wireless network nodes and antennas at the intersection points as mentioned above, thereby enables the deployment of the whole network without requiring any network data cables so long as the maximum number of carrier frequencies supportable by the wireless network node is equal or larger than the number of intersecting shielded regions at each intersection point.

In another preferred embodiment of the invention, a wireless network node placement method is applied by deploying two wireless network nodes instead of one at the intersection point of shielded regions, extending as many as the number of supported carrier frequencies of the mentioned wireless network nodes' antennas support to respective regions at the mentioned intersection point, as explained above. Doing so, the invention provides redundancy in case of failure in one of the mentioned wireless network nodes at the intersection. The invention is described below in more details through a description of example models shown in the attached diagrams in a simplified manner.

In another preferred embodiment of the invention, a node placement algorithm is applied to systematically determine the corners at which the wireless network nodes can be deployed such that the fewest number of corners is needed.

Figure 2:
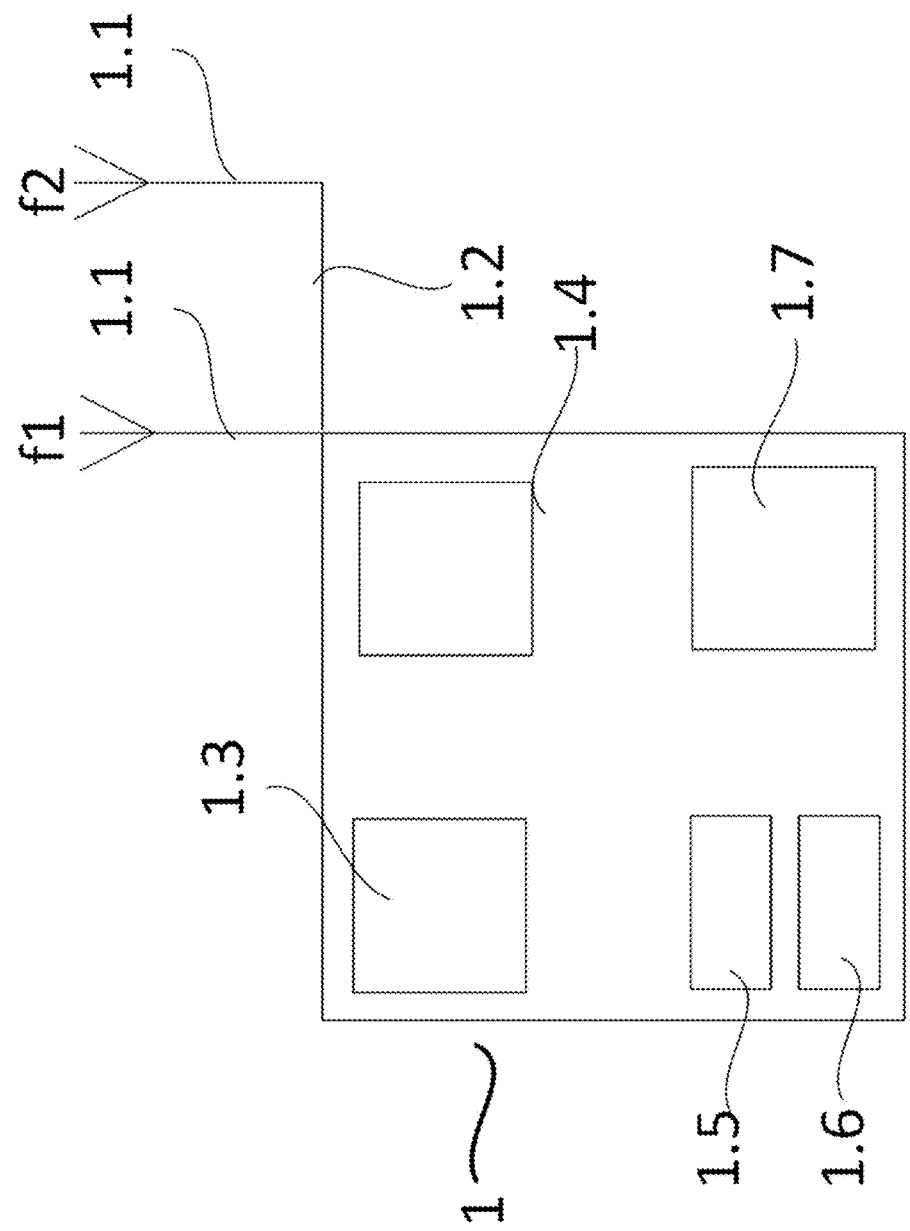
FIG. 2 depicts a block diagram of wireless network node supporting two carrier frequencies and a single antenna cable in a representative simplified system of the invention.
Figure 4:
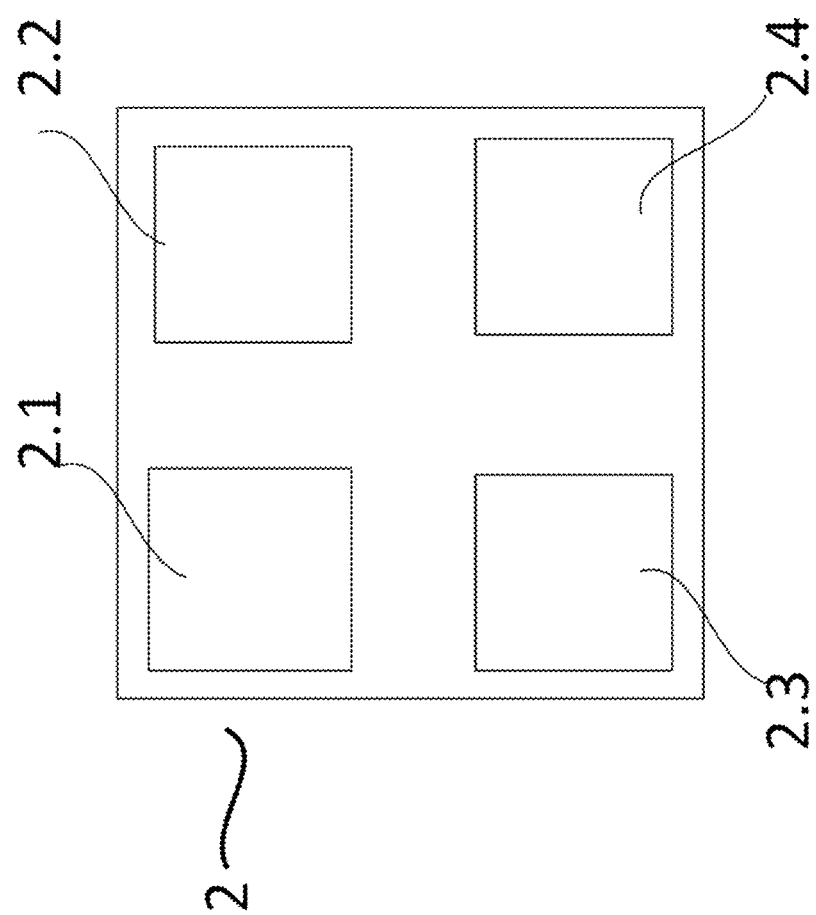
FIG. 4 shows a block diagram of wireless client device in a representative application of the invention.

The application of the invention described in the figures is related to the system and method regarding the deployment of wireless access and transmission network in environments that involve electromagnetically shielded regions with low radio signal permeability between regions. FIG. 1 illustrates a simple variant of the wireless network node (1)

of this invention with a single carrier frequency support, which is a regular wireless network node according to prior art used for access and transmission within each region. In FIG. 4, a sample wireless client device (such as a computer or a phone) using the wireless node of FIG. 1 is shown. The components of the wireless network node and wireless client device are shown (see reference numbers and corresponding definitions above). In the aforementioned network, wireless network node(s) (1) transfer data among each other through wireless node wireless module (1.4) and wireless antenna (1.1) or through wired/cabled data connection port(s) (1.7) and network data cable(s). The wireless network node (1) through wireless network node wireless module (1.4) can enable wireless client devices to connect to the wireless access and transmission network. The invention provides additional advantages in different embodiments by using a more advanced version of the regular wireless network node shown in FIG. 1 which are available commercially as a Wi-Fi network node, with a single carrier frequency support, or with two carrier frequency support, as shown in FIG. 2.

Figure 3:
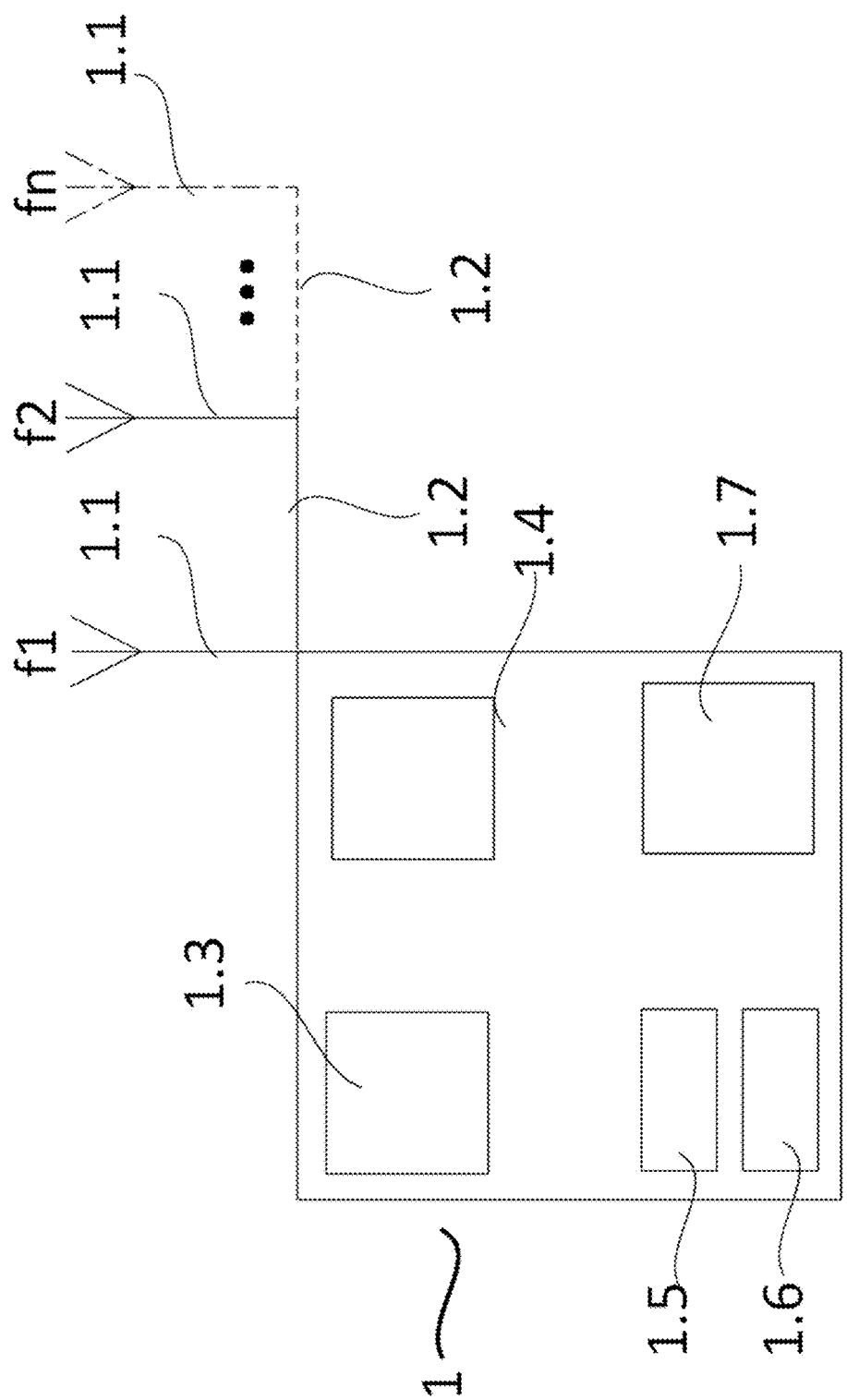
FIG. 3 shows a block diagram of wireless network node supporting many carrier frequencies via many antenna cables and many network data cable interfaces as a representative system of the invention.

The system of invention, illustrated in FIG. 3, supports many antennas such that each antenna has a software configurable different carrier frequency. Additionally, wireless antenna cable (1.2) can be used to extend any antenna away from the box. The node can be connected to another similar wireless network node via a network data cable, or it can connect several other wireless network nodes using several data cables (1.2). The length of the antenna cable mounted to the wireless network node to extend the antenna is dependent on the chosen carrier frequency for that antenna so as to keeping the signal attenuation within the antenna cable at minimum. This subject is prior art and hence not covered in the detail within this patent application. The assignment of carrier frequencies to different antennas is made possible by a manual or remote configuration using wireless network node wireless module (1.4).

An exemplary wireless client device (2) illustrated in FIG. 4 connects, using wireless module (2.2), to a wireless network node (1) to join the wireless access and transmission network. The wireless client device (2) sends and receives data packets over wireless network nodes (1). Wireless network nodes that receive data from wireless client devices (2) route these data packet either to another wireless client device (2) or to another wireless network node. The programs that are stored in the wireless client program memory (2.4) which run on the wireless client device processor (2.1) by using wireless client temporary or permanent memory (2.3) can transfer data over the aforementioned wireless access and transmission network.

After receiving a data packet either from wireless client device (2) or from another wireless network node (1), the receiving wireless network node (1) takes a number of actions towards routing the data packet to its target based on the destination information on the data packet. In order to make sure the data packet reaches its target, the routes in the wireless access and transmission network are determined between the target and the source. These routes are composed of one or more wireless network nodes (1). Meaning, when the data packet is on its way to its target, it may visit more than one wireless network node (1). These nodes form an interconnected network using different topologies, but in general utilizing a mesh topology. Based on the topology, a wireless network node (1) can be a neighbor to one or more wireless network nodes (1). For proper routing, wireless network nodes (1) should have the abovementioned route information. The nodes obtain the routing information in several ways; the routing information can be configured statically, computed dynamically within the wireless network nodes, or the wireless network node can fetch this information from a server. Different routing algorithms that are stored within wireless network node program memory (1.6) can be executed on wireless network node processors (1.3) to calculate dynamic routes. These algorithms calculate the routes dynamically through the communications of wireless network nodes with each other and exchanging reachability information such as their immediate neighbors. Wireless network nodes (1) store route information in their temporary or permanent memory (1.5). This subject is prior art and hence not detailed here.

If the target's destination received by the wireless network node (1) is a client attached to the same node, it routes the data packet to this client device. Otherwise, it forwards to the next hop network node. It can compute the next hop using the route information found in its temporary or permanent memory (1.5) determined through a routing algorithm as well as the destination information. When transmitting the data, if a wireless connection exists between the wireless network node (1) and the target (or the next hop), the wireless network node (1) uses the wireless module (1.4) and wireless antenna (1.1), otherwise if a network data cable connection exists, then it uses the cabled data connection port (1.7) and network data cable (4). Please note that in the above descriptions, no distinction is not made between a prior art wireless network node (1), illustrated in FIGS. 1 and 2, and the wireless network node of this invention (1), illustrated in FIG. 3, since the routing and forwarding behavior of these nodes are the same.

Figure 5:
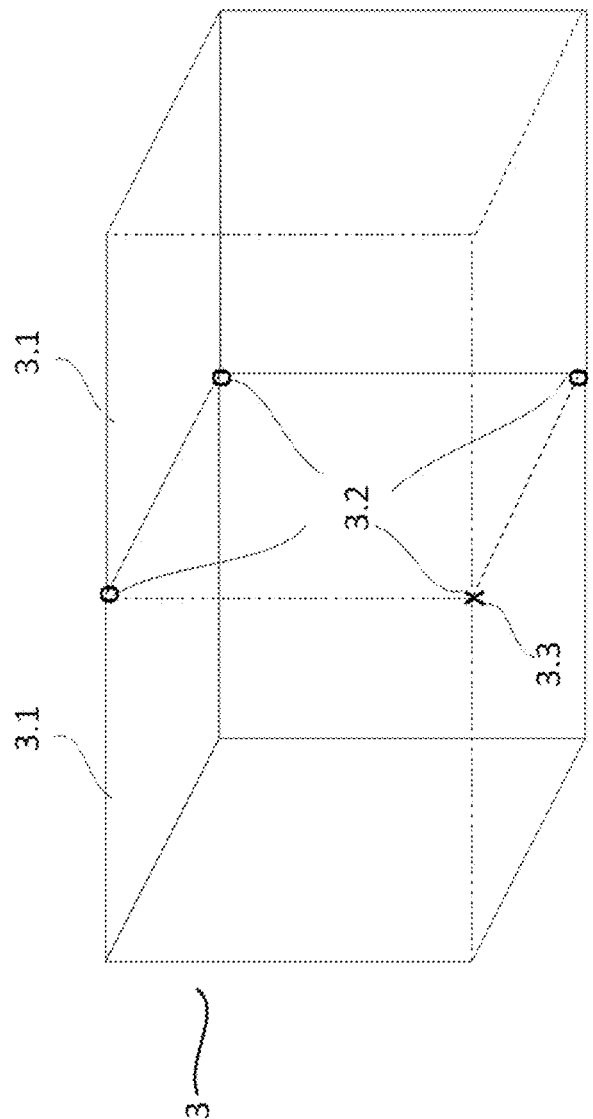
FIG. 5 depicts a schematic appearance showing the intersection points of electromagnetically shielded regions in a representative application of the invention.

In FIG. 5, a sample environment (3) containing multi-divisioned electromagnetically shielded regions (3.1) with low radio signal permeability between each region is depicted along with the intersection points of these regions (3.2) plus a selected intersection point for wireless network node placement (3.3). While this figure shows only two neighboring horizontal regions (3.1), as the number of neighboring horizontal and vertical regions (3.1) increase, the mentioned intersecting points (3.2) may cover more number of neighbor regions (3.1).

Figure 6:
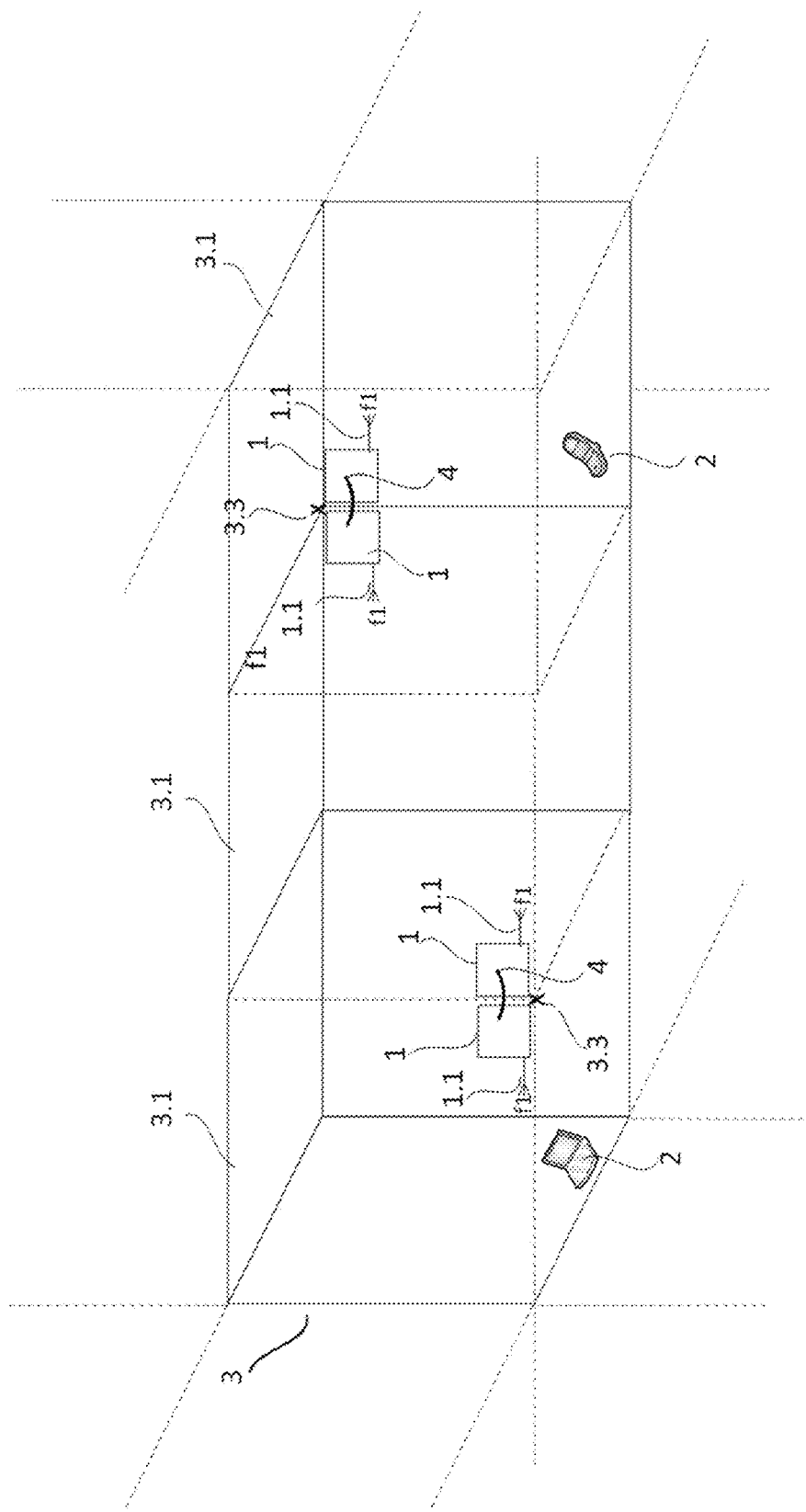
FIG. 6 shows a schematic appearance showing the data exchange between multi-floor electromagnetically shielded regions via connection of wireless network nodes using short network data cables.

In FIG. 6, one of the applications of the invention methods for selecting node location at the intersection points in a simple environment (3) containing three horizontal electromagnetically shielded regions (3.1) with low radio signal permeability between the regions is depicted. There are two intersection points (from right to left in the picture), between the first and second horizontal regions (3.1) and between the second and third horizontal regions (3.1), each region supporting the same carrier frequency $f_1$ for simplicity. Since the same carrier frequency is used across all regions, a prior art wireless network node (1) according to FIG. 1 would be sufficient for placement at the intersection points. At each intersection point, there are four possible locations (3.2) for a wireless node placement as illustrated in FIG. 5. The first pair of wireless network nodes (1), between the first and second regions is placed at the bottom left corner of all four locations at the intersection point (3.3), while the second pair of wireless nodes (1) between the second and third regions is placed diagonally, at the upper right corner.

The selection of diagonal corners allows for maximum wireless coverage while reducing the number of wireless nodes needed in a typical scenario of multi-floor region distribution with horizontal and vertical adjacencies. The upper corners serve the upper floor while the lower corners serve the lower floor. The locations of the wireless nodes are dependent on the topology of the intersecting regions.

Since radio permeability between electromagnetically shielded regions would be extremely low, it is impossible for two wireless network nodes placed at each selected intersection point (3.3) to communicate with each other using a wireless connection. Therefore, network data cable (4) is inevitable to establish communication between these wireless network nodes (1) placed at different regions. In addition, in order to establish wireless communication between different wireless network nodes (1) located within the same electromagnetically shielded region (3.1), their antennas (1.1) within the same region need to support the same carrier frequency, $f_1$. Wireless network nodes (1) are connected to each other through wireless connection and provide network access to wireless client devices (2) via wireless connection within each region. However, wireless client devices (2) across regions (3.1) communicate via wireless network nodes (1) deployed at the intersection points and wired using network data cable (4). As the number of neighboring horizontal and vertical electromagnetically shielded regions (3.1) increase, for each region (3.1) at the selected intersection point (3.3) a wireless network node (1) must be placed, and communications between wireless network nodes (1) should be established as mentioned above.

Figure 7:
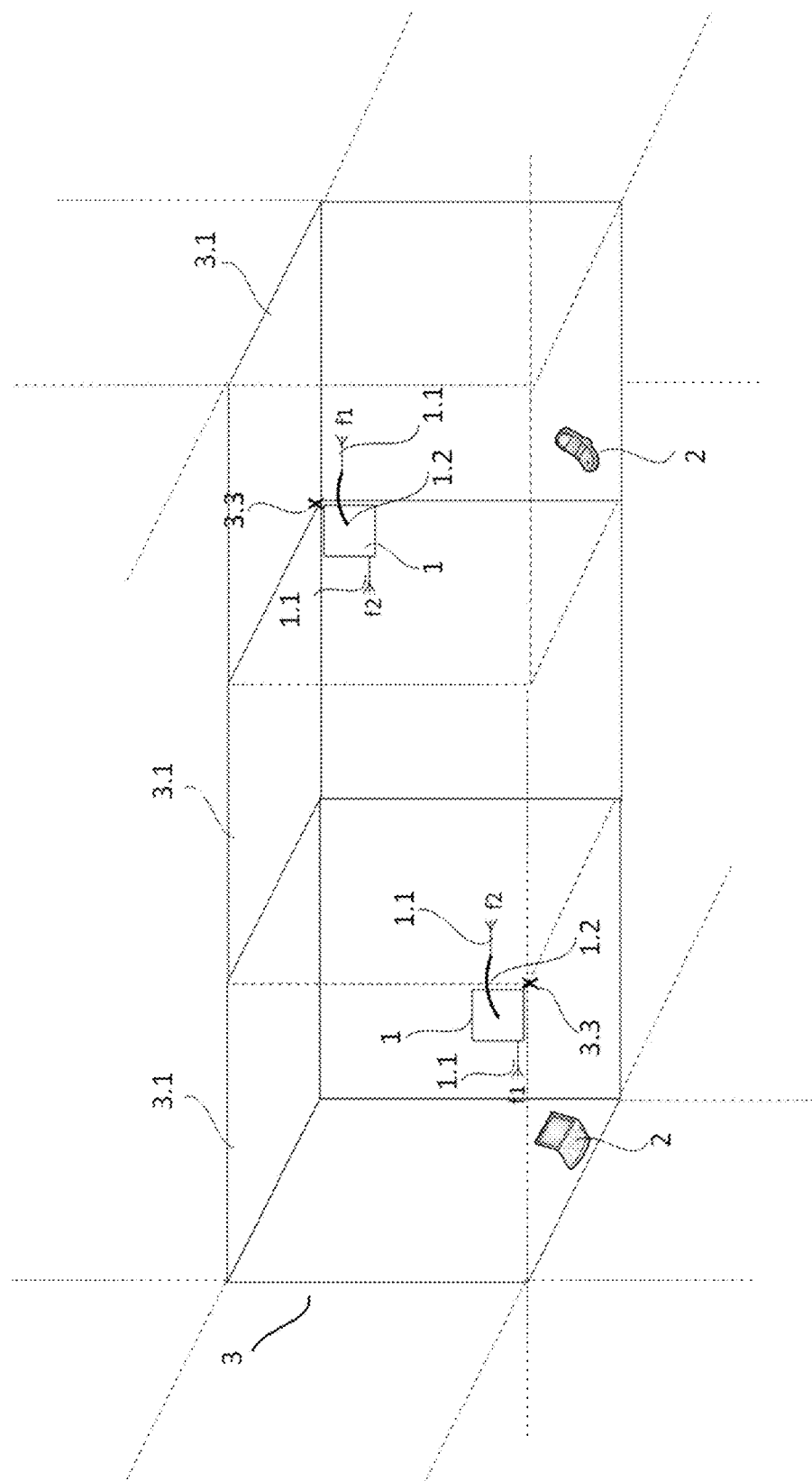
FIG. 7 shows a schematic appearance showing the data exchange between multi-floor electromagnetically shielded regions via extension of antennas of wireless network nodes to neighbor regions in a representative application of the invention.

FIG. 7 illustrates the application of the novel antenna extension technique of this invention using the system of invention illustrated in FIGS. 2 and 3. In this technique data exchange between electromagnetically shielded regions (3.1) are established by using a single wireless network node (1) at each intersection by using its wireless node wireless module (1.4) and simply extending its wireless antenna (1.1) via wireless antenna cable (1.2) to the adjacent region (3.1). Comparing with FIG. 6, we reduced the required number of wireless network nodes (1) from four to two. The first and third regions, which are not adjacent, support carrier frequency $f_1$, while the second region, adjacent to both first and third regions, support carrier frequency $f_2$. Wireless network node (1) is placed at one of the two regions at a select location at the intersection point (3.3) out of the available four locations (3.2) wherein the selection of (3.3) is based on the network topology. Wireless antenna (1.1) of the mentioned wireless network node (1), shown in FIG. 2, operating in the first carrier frequency, $f_1$, is placed in first electromagnetically shielded region (3.1), and the secondary antenna (1.1) operating in the second carrier frequency, f2, is extended to the second neighbor electromagnetically shielded region (3.1). The advantage of the technique is the reduction of the number of wireless network nodes (1) while providing network connection between electromagnetically shielded regions (3.1) where radio permeability between regions (3.1) is low. Of course, the antennas (1.1) that belong to different wireless network nodes (1) located within the same electromagnetically shielded region (3.1) need to support the same carrier frequency in order to establish wireless communications in between.

The technique of FIG. 7 can be extended to many electromagnetic shielded regions intersecting at an intersection point. Wireless network node (1) of this invention and its antenna (1.1) operating in the first carrier frequency, $f_1$, is placed in the 1st electromagnetically shielded region (3.1) at the intersection point, and its' other antennas (1.1) operating in carrier frequencies $f_2$, $f_3$, . . . , $f_n$, are extended to the remaining neighbor electromagnetically shielded regions 2, 3, . . . , n, respectively, via wireless antenna cables (1.2). As a result, one wireless network node is sufficient to provide network connection to multiple intersecting electromagnetically shielded regions (3.1), up to the maximum number of supported carrier frequencies of the mentioned wireless network node (1). If the maximum number of supported carrier frequencies of the wireless network node (1) is equal or more than the number of electromagnetically shielded regions (3.1) intersecting at the selected intersection point (3.3), then one wireless network node (1) would be sufficient to provide connectivity across all mentioned intersecting electromagnetically shielded regions (3.1). As a result, the wireless access and transmission network in the whole network can be established without using any network data cables (4). In addition to advantages of network data cable (4) free solution, further reduction of the number of total wireless network nodes (1) in the whole network is achieved. If the maximum number of supported carrier frequencies of the wireless network node (1) is less than the number of electromagnetically shielded regions (3.1) intersecting at the selected intersection point (3.3), then more than one wireless network node (1) would be needed to provide connectivity across all mentioned intersecting electromagnetically shielded regions (3.1), similar to the case illustrated in FIG. 6, in which case a network data cable across the deployed (more than one) wireless network nodes (1) is required.

Figure 8:
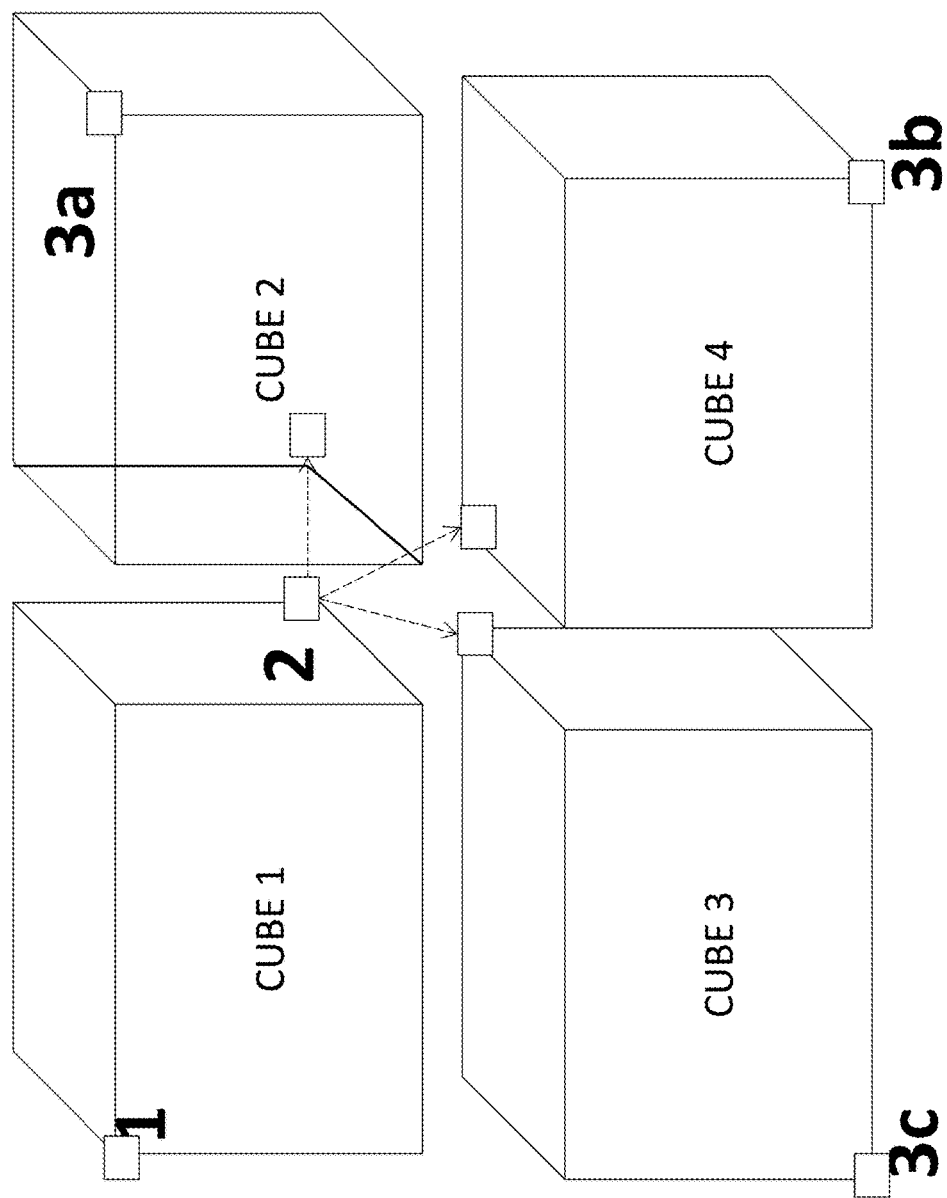
FIG. 8 depicts a schematic appearance showing candidate corners for selecting the location of wireless network nodes for enabling data exchange between electromagnetically shielded regions in a representative application of a method of invention.

In FIG. 8, a key aspect of the present invention for an environment containing many electromagnetically shielded regions with low radio signal permeability between regions where the four depicted adjacent regions are shaped as cubes. It should be noted that in FIG. 8, the four regions are as if they are a bit apart instead of being adjacent, but this is done just for ease of viewing and to better illustrate the algorithm. In one embodiment, the present invention's algorithm for selecting corners comprises the following steps:

Step 1: First, we start with the first corner and mark it as point "1" (represented in FIG. 8 in the upper, front, portion of CUBE 1).

Step 2: Second, we find the space diagonal point of corner "1" in CUBE 1 (represented in FIG. 8 in the lower, rear, portion of CUBE 1) and label it point "2".

Step 3 Third, point "2" has touch points in CUBES 2, 3 and 4 as well (illustrated as light shaded rectangles at the end of the dotted arrow). Therefore, one can now hop to each cube and then find the space diagonal corner to corner "2" in CUBES 2, 3 and 4. That is, we hop from point "2" via paths shown in the dotted lines into each of the CUBES 2, 3 and 4, and from that point mark the space diagonal points in CUBES 2, 3 and 4, represented by "3a" (in CUBE 3), "3b" (in CUBE4), and "3c" (in CUBE3).

Step 4: Next, we eliminate corners starting with those corners with least number of intersecting cubes. This step requires first putting corners in an ordered list with least number to the most number of intersecting regions in the list: {"1", "3a", "3b", "3c", "2"}. Step 4 is broken into the following steps:

Step 4-1: Does eliminating point "1" impact coverage? No, because point "2" also covers CUBE 1. So, eliminate point "1".

Step 4-2: Does eliminating point "3a" impact coverage? No, because point "2" also covers CUBE 2. So, eliminate point "3a".

Step 4-3: Does eliminating point "3b" impact coverage? No, because point "2" also covers CUBE 3. So, eliminate point "3b".

Step 4-4: Does eliminating point "3c" impact coverage. No, because point "2" also covers CUBE 4. So, eliminate point "3c".

Accordingly, per the algorithm of the present invention, we end up with only corner "2", since the above analysis notes that it covers all four regions.

Figure 9:
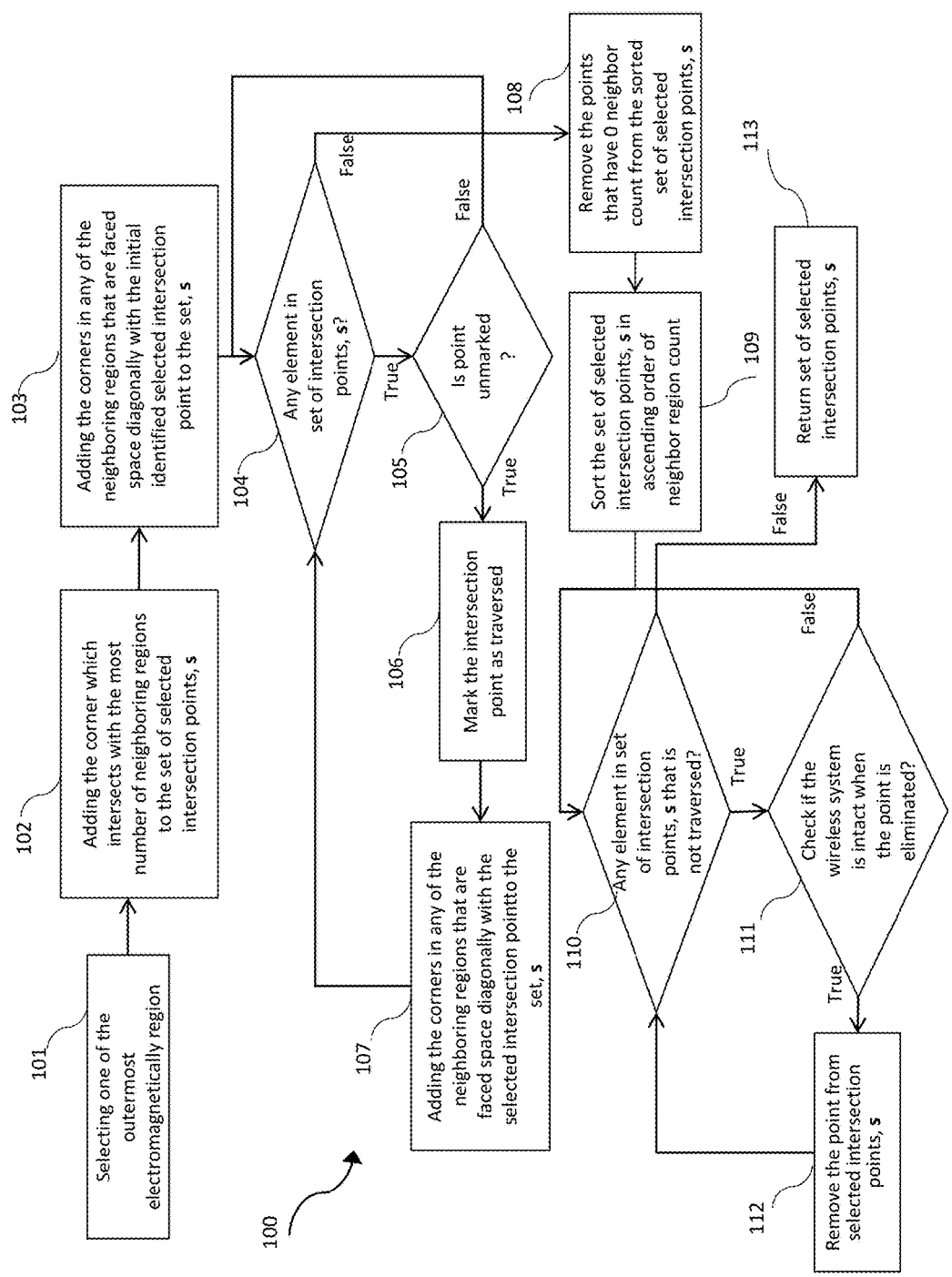
FIG. 9 shows a flow chart appearance showing the wireless network node location selection algorithm of the invention.

In order to cover the entire topology with the least number of wireless network nodes (1), a novel wireless node placement selection algorithm is presented in this invention. FIG. 9 shows the steps of algorithm (100), which aims at finding the smallest possible number of locations for wireless network nodes (1) to offer complete wireless access and transmission in a plurality of electromagnetically shielded regions (3.1) such that the wireless communications between any selected two devices (2) in any arbitrarily selected two regions (3.1) is enabled. The novelty of algorithm (100) lies at the placement strategy of wireless network nodes (1). First novelty of algorithm (100) is using intersection points (3.2) of regions (3.1) as possible locations for placement of nodes (1). With only one wireless network node (1) deployed at the intersection point, and by using the above mentioned antenna extension method, it becomes possible to provide wireless access and transmission within and across electromagnetically shielded regions (3.1). Second novelty of algorithm (100) is exploiting space-diagonal facing corners that are also intersection points (3.2) of the regions (3.1) to further reduce the number of wireless network nodes (1) needed. The advantage of space-diagonally placement of nodes is more clearly revealed in a complex environment, which contains many vertical and horizontal neighbor regions (3.1), as illustrated in FIG. 8.

The result of algorithm (113) produces a set of candidate intersection points (3.3) for placement of wireless network nodes. First algorithm (100) selects one of the outermost electromagnetically shielded region out of all regions (101), which in this example case is upper left front corner, and then identifies the corner which intersects with the most number of neighboring regions, which in this example is the lower right back corner of said region, and adding said corner as a selected intersection point to the set of candidate intersection points (102). Then, the algorithm identifies the corners in any of the neighboring regions that are faced space diagonally with the readily identified selected intersection point according to the geometry of the regions, and adds those corners as new selected intersection points to the set of candidate intersection points (103). Next, the algorithm selects an intersection point by traversing the set of selected intersection points one by one (104), marks the selected point as traversed (106), identifies new corners in any of the neighboring regions that are faced space diagonally with the already selected intersection point, and adds those corners as selected intersection points to the set of selected intersection points (107). By repeating the previous step on unmarked intersection points (105) within the set of intersection points until no unmarked intersection points left in the set of candidate intersection points, the algorithm outputs a set of possible intersection points as candidates for placement of wireless nodes to provide complete wireless communication within and across all electromagnetically shielded regions. After identifying the candidate locations, the algorithm continues with the elimination of those locations from the list of candidate locations that are superfluous while keeping communications intact. First, the process identifies and removes (108) the points within the selected intersection points, which do not have any neighboring electromagnetically shielded region. Second, the process traverses the set of selected candidate intersection points one by one (110) starting from those points with the least number of neighboring regions moving towards the most (109), checking whether a selected candidate point can be eliminated from set (111) while keeping communications intact, and if so removing said point from the set of selected candidate intersection points (112). As a result, the algorithm at the final step produces the smallest set of intersection points for node locations (113) for the given environment.

Figure 10:
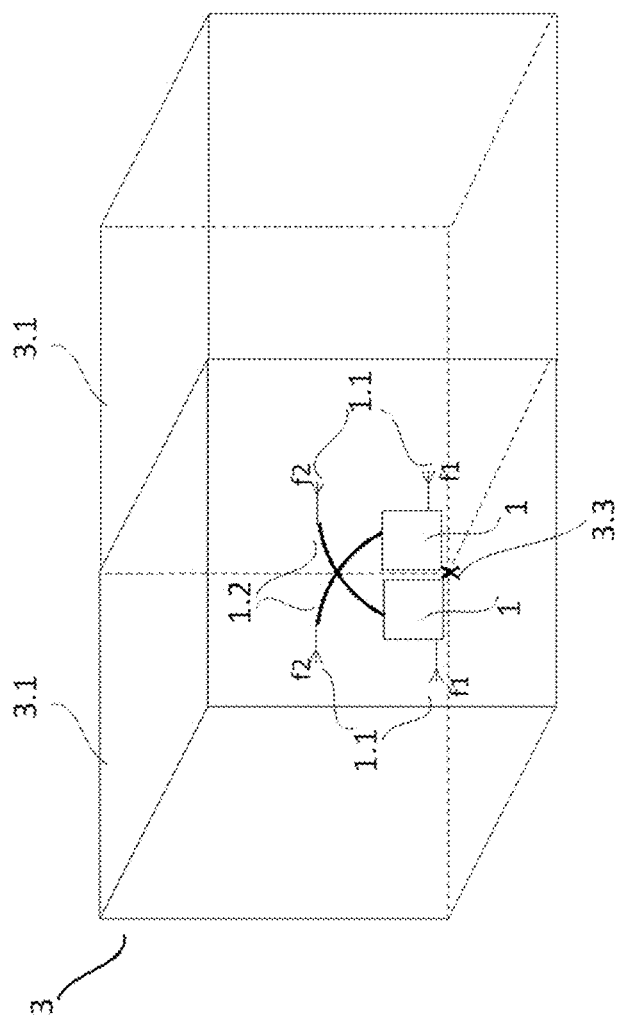
FIG. 10 shows a schematic appearance showing the addition of redundancy for wireless access and transmission network between electromagnetically shielded regions in a representative application of the invention.

Another embodiment of the invention, which provides redundancy, is depicted in FIG. 10. In this technique, for each wireless network node (1) placed at an intersection point (3.3) of electromagnetically shielded regions another identical node is deployed for redundancy. If one of these two nodes at the intersection fails, the other node is used to cover the regions. With this method, redundant connections to as many regions (3.1) as the number of supported carrier frequencies by the wireless network node (1) is achieved by placing two wireless network nodes (1) at the selected intersection point (3.3).

In summary, the wireless access and transmission network for an environment (3) containing multi-floor horizontal and vertical electromagnetically shielded regions is configured by applying the system and the node placement methods defined by the invention regarding the deployment of wireless network nodes (1) at the selected intersection points (3.3) achieving significant reduction in wireless network nodes and network data cables. This invention provides a number of significant advantages such as reduction of cost, energy consumption, and total physical weight due to reduced amount of hardware deployed. Furthermore, the maintenance and management of the wireless access and transmission network costs are reduced proportional to the reduced number of nodes. Reduced number of wireless network nodes (1) lowers network control traffic, streamlining the network, and thus, providing more bandwidth for the data traffic. Besides, reducing the number of wireless network nodes (1) also reduces the amount of network node information that is input to routing algorithms and therefore reduces the processing power and memory capacity requirements for routing. Along with the decrease of processing power and memory capacity requirements for the wireless network nodes (1), end-to-end network latency and jitter are also decreased.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

An innovative system and methods are described to establish a communications path across multiple electromagnetically shielded regions, as can be seen in ships or shelters, by deploying a special wireless network node at the intersection point of such regions. Simply by deploying one antenna of the wireless network node within the $1^{st}$ region using carrier frequency $f_1$ of that region, and extending the antennas of the wireless network node to other regions ($2^{nd}$, $3^{rd}$, . . . ) using an antenna cable per antenna and by using carrier frequencies $f_2$, $f_3$, . . . respectively corresponding to regions 2, 3, . . . , a wireless communications path across all these regions is established without needing any network data cables. Doing so, deployment of a single wireless network node can suffice for up to a number of intersecting shielded regions equal to or less than that supportable maximum number of different carrier frequencies of the wireless network node. Various enhancements and variations to this method are also described.

The invention claimed is:

1. A wireless network node placement method to reduce the number of nodes deployed in a plurality of magnetically shielded regions that intersect horizontally and vertically, the method comprising:
   (a) selecting an outermost electromagnetically shielded region out of the plurality of magnetically shielded regions, identifying a corner in the outermost electromagnetically shielded region which intersects with most number of neighboring regions, and adding the corner as a selected intersection point to a set of candidate intersection points, and:
      (i) identifying all other corners that are space diagonally located with respect to the identified corner in (a), where such corners are in those intersecting neighboring regions of the identified corner in (a),
      (ii) adding corners identified in (a)(i) to the set of candidate intersection points, and
      (iii) marking all regions touched by corners in the set of candidate intersection points as traversed regions with remaining regions staying un-traversed;
   (b) repeating steps (a)(i) through a(iii) at intersection points of un-traversed regions until no un-traversed region is left by selected corners in the set of candidate intersection points;
   (c) eliminating superfluous corners in the set of candidate intersection points by starting from those corners with least number of intersecting neighboring regions and moving towards corners with most number of intersecting neighboring regions and assessing whether a given corner can be eliminated from the set without creating an un-traversed region and, when so, removing it from the set of candidate intersection points; and
   (d) outputting the set of candidate intersection points after the eliminating step (c) as the reduced number of nodes to be deployed in the plurality of magnetically shielded regions.

2. The method of claim 1, wherein the wireless network node operates based on any of the following standards: Wi-Fi, or WiMAX or 4G or 5G standards.

3. A wireless network node placement and wireless transmission method to remove the need for a data cable and to reduce the number of wireless networks nodes for a first magnetically shielded region and second magnetically shielded region with an intersection point, the first magnetically shielded region and second magnetically shielded region using different carrier frequencies, $f_1$ and $f_2$, respectively, the method comprising:
   (a) deploying, at the intersection point between the first magnetically shielded region and the second magnetically shielded region and, on the first electromagnetically shielded region's space, a single wireless network node, the single wireless network node comprising a first and second antenna, the first antenna operating at the carrier frequency $f_1$,
   (b) extending the single wireless network node's second antenna towards the second magnetically shielded region's space via an antenna cable for operation at the carrier frequency $f_2$, and
      wherein wireless access and transmission is provided across the first and said second electromagnetically shielded regions via the single wireless network node's first antenna operating at carrier frequency $f_1$ in the first electromagnetically shielded region and the single wireless network node's extended second antenna operating at carrier frequency $f_2$ in the second electromagnetically shielded regions.

4. The method of claim 3, wherein the single wireless network node operates based on any of the following standards: Wi-Fi, or WiMAX or 4G or 5G standards.

5. A wireless network node placement and transmission method to remove a need for a data cable and to reduce the number of wireless networks nodes in n number of neighboring electromagnetically shielded regions meeting at an intersection point, the regions supporting carrier frequencies $f_1, f_2, f_3, \ldots, f_n$, the method comprising:
   (a) deploying, at the intersection point, a single wireless network node with a maximum number of supportable carrier frequencies equal or larger than n, the single wireless network node being placed within the first electromagnetically shielded region's space, the single wireless network node comprising a plurality of antennas, one for each of the carrier frequencies $f_1, f_2, f_3, \ldots, f_n$, the first antenna operating at the carrier frequency $f_1$, the single wireless network node's first antenna operating at the carrier frequency $f_1$,
   (b) extending each of the wireless network node's other antennas operating at the carrier frequencies $f_2, f_3, \ldots, f_n$ towards regions 2, 3, ..., n, respectively, via an antenna cable for operation at the carrier frequencies $f_2, f_3, \ldots, f_n$, and
      wireless access and transmission is provided across the first and said second electromagnetically shielded regions via the single wireless network node's antennas operating at carrier frequency $f_1$ in the first electromagnetically shielded region and the single wireless network node's extended antennas operating at the carrier frequencies $f_2, f_3, \ldots, f_n$, in remaining electromagnetically shielded regions 2, 3, ..., n.

6. The method of claim 5, wherein the single wireless network node operates based on any of the following standards: Wi-Fi, or WiMAX or 4G or 5G standards.

7. The method of claim 5, wherein the carrier frequencies $f_1, f_2, \ldots, f_n$ are identical.

8. The method of claim 5, wherein the carrier frequencies $f_1, f_2, \ldots, f_n$ are different.

9. The method of claim 5, wherein when applied at a network of many magnetically shielded regions meeting at different intersection points in groups of regions, with number of regions in each of the groups being less than or equal to the maximum number of carrier frequencies supportable by the single wireless network node, data transmission being completely wireless, without using any network data cables.

10. A wireless network node placement and transmission method to provide redundancy in n number of neighboring electromagnetically shielded regions meeting at an intersection point, said regions supporting carrier frequencies $f_1, f_2, f_3, \ldots, f_n$, the method comprising the steps of:
   (a) deploying a first and second identical wireless network nodes, each of the first and second identical nodes with a maximum number of supportable carrier frequencies equal or larger than n at the intersection point, such that if one of the first or second identical wireless network nodes fail, the other node provides wireless access and transmission across said plurality of electromagnetically shielded regions;
   (b) placing the first wireless network node within a first electromagnetically shielded region's space, the first wireless network node comprising a plurality of antennas, one for each of the carrier frequencies $f_1, f_2, f_3, \ldots, f_n$, the first antenna of the first wireless node operating in the first electromagnetically shielded region's space at the carrier frequency $f_1$, with remaining antennas of the first wireless node extended towards other electromagnetically shielded regions 2, 3, ..., n, via an antenna cable, with the remaining antennas of the first wireless node operating at carrier frequencies $f_2, f_3, \ldots, f_n$, respectively; and (c) placing the second wireless network node within a second electromagnetically shielded region's space, the second wireless network node also comprising a plurality of antennas, one for each of the carrier frequencies $f_1, f_2, f_3, \ldots, f_n$, the first antenna of the first wireless node operating in the first electromagnetically shielded region's space at the carrier frequency $f_2$, with remaining antennas of the first wireless node extended towards other electromagnetically shielded regions 1, 3, ..., n, via an antenna cable, with the remaining antennas of the second wireless node operating at carrier frequencies $f_1, f_3, \ldots, f_n$, respectively.

11. The method of claim 10, wherein when there is a plurality of magnetically shielded regions intersect horizontally and vertically, improving the method by first preparing a set of selected corners according to the method of claim 1 and deploying wireless network nodes at these corners.

12. The method of claim 10, wherein the first wireless network node operates based on any of the following standards: Wi-Fi, or WiMAX or 4G or 5G standards.

13. The method of claim 10, wherein the second wireless network node operates based on any of the following standards: Wi-Fi, or WiMAX or 4G or 5G standards.

14. The method of claim 10, wherein the carrier frequencies $f_1, f_2, \ldots, f_n$ are identical.

15. The method of claim 10, wherein the carrier frequencies $f_1, f_2, \ldots, f_n$ are different.

\* \* \* \* \*